(12) United States Patent
Kondo

(10) Patent No.: US 12,456,390 B2
(45) Date of Patent: Oct. 28, 2025

(54) DRIVING JUDGMENT APPARATUS, IN-VEHICLE APPARATUS, DRIVING JUDGMENT SYSTEM, DRIVING JUDGMENT METHOD, DATA TRANSMISSION METHOD, AND RECORDING MEDIUM

(71) Applicant: NEC Corporation, Tokyo (JP)

(72) Inventor: Hiroki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 159 days.

(21) Appl. No.: 18/023,519

(22) PCT Filed: Sep. 1, 2020

(86) PCT No.: PCT/JP2020/033083
§ 371 (c)(1),
(2) Date: Feb. 27, 2023

(87) PCT Pub. No.: WO2022/049628
PCT Pub. Date: Mar. 10, 2022

(65) Prior Publication Data
US 2023/0260420 A1    Aug. 17, 2023

(51) Int. Cl.
*G09B 9/052* (2006.01)
*B60W 40/09* (2012.01)
(Continued)

(52) U.S. Cl.
CPC .............. *G09B 9/052* (2013.01); *B60W 40/09* (2013.01); *B60W 60/005* (2020.02); *G07C 5/008* (2013.01)

(58) Field of Classification Search
CPC ... B60W 2040/0809; B60W 2050/146; B60W 2420/403; B60W 2520/10;
(Continued)

(56) References Cited

U.S. PATENT DOCUMENTS 9,056,616 B1 * 6/2015 Fields .................. G09B 19/167
10,373,523 B1 * 8/2019 Fields .................... G06Q 50/20
(Continued)

FOREIGN PATENT DOCUMENTS

JP       6086515 B1      3/2017
JP   2018135058 A   *   8/2018
(Continued)

OTHER PUBLICATIONS

International Search Report for PCT Application No. PCT/JP2020/033083, mailed on Oct. 6, 2020.
(Continued)

*Primary Examiner* — Babar Sarwar

(57) ABSTRACT

The driving judgment apparatus according to this disclosure includes a running data acquisition unit for acquiring the running data of a vehicle running on a predetermined course by manual driving of a driver after the vehicle that can run by self-driving or manual driving performs a model running on the course by self-driving; and an item judgment unit for judging the propriety of the driver's driving for each item based on evaluation reference data and at least one of the difference between the running data acquired by the running data acquisition unit and model running data and the running data acquired by the running data acquisition unit.

7 Claims, 10 Drawing Sheets

(51) Int. Cl.
*B60W 60/00* (2020.01)
*G07C 5/00* (2006.01)

(58) Field of Classification Search
CPC ....... B60W 2520/105; B60W 2540/18; B60W 2540/20; B60W 2540/225; B60W 2556/45; B60W 2556/50; B60W 40/08; B60W 40/09; B60W 50/14; B60W 60/005; G07C 5/008; G09B 19/00; G09B 9/052

See application file for complete search history.

(56) References Cited

U.S. PATENT DOCUMENTS

| | | | | |
|---|---|---|---|---|
| 11,475,791 | B2* | 10/2022 | Simmons | G07C 5/0866 |
| 12,062,287 | B2* | 8/2024 | Farnham, IV | G06F 3/04842 |
| 2011/0251734 | A1* | 10/2011 | Schepp | B60W 40/09 |
| | | | | 701/1 |
| 2017/0213458 | A1* | 7/2017 | Gordon | E01F 13/04 |
| 2018/0349975 | A1* | 12/2018 | Lee | G07C 5/0808 |
| 2019/0016345 | A1* | 1/2019 | Kitagawa | B60W 30/18163 |
| 2019/0056731 | A1* | 2/2019 | Westbrook | G05D 1/0061 |
| 2019/0126935 | A1* | 5/2019 | Phillips | G07C 5/0808 |
| 2020/0215917 | A1* | 7/2020 | Schöning | B60K 35/29 |
| 2021/0065275 | A1* | 3/2021 | Denthumdas | B60K 35/654 |
| 2021/0107494 | A1* | 4/2021 | Silver | B60Q 9/008 |
| 2021/0163043 | A1* | 6/2021 | Lee | B60W 10/18 |

FOREIGN PATENT DOCUMENTS

| | | | | |
|---|---|---|---|---|
| JP | 2019-101191 A | | 6/2019 | |
| WO | WO-2014152761 A1 | * | 9/2014 | ............ G09B 19/00 |
| WO | WO-2019167257 A1 | * | 9/2019 | ............ G08G 1/00 |
| WO | 2020/049737 A1 | | 3/2020 | |

OTHER PUBLICATIONS

JP Office Communication for JP Application No. 2022-546745, mailed on Dec. 26, 2023 with English Translation.
JP Office Action for JP Application No. 2024-071333, mailed on Dec. 17, 2024 with English Translation.

* cited by examiner

| CLASSIFI-CATION | ITEM No. | ITEM NAME | DETERMINATION OF PROPRIETY FOR DRIVER'S DRIVING |
|---|---|---|---|
| INTERSECTION WITH TRAFFIC LIGHT | 1 | DECELERATION BEFORE TRAFFIC LIGHT | WHEN DIFFERENCE BETWEEN RUNNING DATA AND MODEL RUNNING DATA FOR JUDGMENT (FOR EXAMPLE, DIFFERENCE IN ACCELERATION (CHANGE IN ACCELERATION) BEFORE TRAFFIC LIGHT) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 2 | CONFIRMATION OF TRAFFIC LIGHT | WHEN DIFFERENCE BETWEEN RUNNING DATA AND MODEL RUNNING DATA FOR JUDGMENT (FOR EXAMPLE, THE DIFFERENCE IN THE TIME THE DRIVER'S LINE OF SIGHT IS DIRECTED AT THE TRAFFIC LIGHT) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 3 | DRIVING ACCORDING TO TRAFFIC LIGHT | WHEN TRAFFIC LIGHT COLOR IN RUNNING DATA IS RED AND VEHICLE SPEED (CHANGE IN VEHICLE SPEED) BEFORE TRAFFIC LIGHT IS LESS THAN EVALUATION REFERENCE DATA (FOR EXAMPLE, THRESHOLD), IT IS JUDGED TO BE SUCCESS. WHEN IT EXCEEDS IT, IT IS JUDGED TO BE FAILURE. |

Fig. 7

| CLASSIFI-CATION | ITEM No. | ITEM NAME | DETERMINATION OF PROPRIETY FOR DRIVER'S DRIVING |
|---|---|---|---|
| INTERSECTION WITH STOP SIGN | 4 | SLOW DRIVING BEFORE INTERSECTION | WHEN DIFFERENCE BETWEEN RUNNING DATA AND MODEL RUNNING DATA FOR JUDGMENT (FOR EXAMPLE, DIFFERENCE IN ACCELERATION (CHANGE IN ACCELERATION) BEFORE TRAFFIC LIGHT) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 5 | CONFIRMATION OF STOP SIGN | WHEN DIFFERENCE BETWEEN RUNNING DATA AND MODEL RUNNING DATA FOR JUDGMENT (FOR EXAMPLE, THE DIFFERENCE IN THE TIME THE DRIVER'S LINE OF SIGHT IS DIRECTED AT THE STOP SIGN) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 6 | SECURE STOP | WHEN VEHICLE SPEED BEFORE STOP SIGN IN DRIVING DATA (CHANGE IN VEHICLE SPEED) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 7 | STOP POSITION | WHEN DISTANCE BETWEEN STOP SIGN POSITION AND VEHICLE STOP POSITION IN RUNNING DATA IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 8 | SAFETY CONFIRMATION OF INTERSECTING ROADS | WHEN DIFFERENCE BETWEEN RUNNING DATA AND MODEL RUNNING DATA FOR JUDGMENT (FOR EXAMPLE, DIFFERENCES IN GAZE MOVEMENT PATTERN WHEN PASSING INTERSECTING ROADS) IS LESS THAN EVALUATION REFERENCE DATA (FOR EXAMPLE, THRESHOLD), IT IS JUDGED TO BE SUCCESS. IF IT EXCEEDS, IT IS JUDGED TO BE FAILURE. |
| | 9 | TWO-STEP STOP | WHEN DIFFERENCE BETWEEN RUNNING DATA AND MODEL RUNNING DATA FOR JUDGMENT (FOR EXAMPLE, DIFFERENCE IN SPEED (CHANGE IN SPEED) BEFORE TRAFFIC LIGHT) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |

Fig. 8

| CLASSIFI-CATION | ITEM No. | ITEM NAME | DETERMINATION OF PROPRIETY FOR DRIVER'S DRIVING |
|---|---|---|---|
| COURSE CHANGE | 10 | PRESENCE OR ABSENCE OF SIGNAL | WHEN THERE IS HISTORY OF TURNING ON BLINKER BEFORE INTERSECTION IN RUNNING DATA, IT IS JUDGED TO BE SUCCESS. WHEN NOT, IT IS JUDGED TO BE FAILURE. |
| | 11 | TIMING OF SIGNAL | WHEN DIFFERENCE BETWEEN RUNNING DATA AND MODEL RUNNING DATA FOR JUDGMENT (FOR EXAMPLE, THE DIFFERENCE IN THE TIMING OF TURNING ON OR OFF THE BLINKER) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 12 | SAFETY CONFIRMATION | WHEN DIFFERENCE BETWEEN RUNNING DATA AND MODEL RUNNING DATA FOR JUDGMENT (FOR EXAMPLE, DIFFERENCES IN GAZE MOVEMENT PATTERN WHEN DRIVER CHANGES COURSE) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 13 | GRADUAL COURSE CHANGE | WHEN DIFFERENCE BETWEEN RUNNING DATA AND MODEL RUNNING DATA FOR JUDGMENT (FOR EXAMPLE, DIFFERENCES IN STEERING ANGLE (CHANGE IN STEERING ANGLE) WHEN DRIVER CHANGES COURSE) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |

Fig. 9

| CLASSIFI-CATION | ITEM No. | ITEM NAME | DETERMINATION OF PROPRIETY FOR DRIVER'S DRIVING |
|---|---|---|---|
| CURVE DRIVING | 14 | DECELERATION BEFORE CURVE | WHEN DIFFERENCE BETWEEN RUNNING DATA AND MODEL RUNNING DATA FOR JUDGMENT (FOR EXAMPLE, DIFFERENCE IN ACCELERATION (CHANGE IN ACCELERATION) BEFORE CURVE) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 15 | SPEED ACCORDING TO DEGREE OF CURVE | WHEN DIFFERENCE BETWEEN RUNNING DATA AND MODEL RUNNING DATA FOR JUDGMENT (FOR EXAMPLE, DIFFERENCE IN SPEED (CHANGE IN SPEED) ACCORDING TO DEGREE OF CURVE) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 16 | STAGGER-FREE DRIVING | WHEN DIFFERENCE BETWEEN RUNNING DATA AND MODEL RUNNING DATA FOR JUDGMENT (FOR EXAMPLE, DIFFERENCE IN RUNNING TRAJECTORY) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |
| | 17 | CORRECT DRIVING POSTURE | WHEN DIFFERENCE BETWEEN RUNNING DATA AND MODEL RUNNING DATA FOR JUDGMENT (FOR EXAMPLE, DIFFERENCE IN DRIVING POSTURE) IS LESS THAN EVALUATION REFERENCE DATA (FOR EXAMPLE, THRESHOLD), IT IS JUDGED TO BE SUCCESS. WHEN IT EXCEEDS, IT IS JUDGED TO BE FAILURE. |

Fig. 10

DRIVING JUDGMENT APPARATUS, IN-VEHICLE APPARATUS, DRIVING JUDGMENT SYSTEM, DRIVING JUDGMENT METHOD, DATA TRANSMISSION METHOD, AND RECORDING MEDIUM

This application is a National Stage Entry of PCT/JP2020/033083 filed on Sep. 1, 2020, the contents of all of which are incorporated herein by reference, in their entirety.

TECHNICAL FIELD

The present disclosure relates to a driving judgment apparatus, an in-vehicle apparatus, a driving judgment system, a driving judgment method, a data transmission method, and a recording medium.

BACKGROUND ART

A driving judgment system for evaluating driver's driving skills is described, for example, in Patent Literature 1. The system acquires behavior information indicating the driver's operation of the vehicle in a driving school, calculates the difference from the behavior pattern of model driving, quantifies how closely the driver's behavior matches or is separated from the behavior pattern of model driving, and determines deduction of points for evaluation based on the numerical value quantified. This allows the driving judgment system to evaluate driver's driving skills.

On the contrary, the inventor considered to acquire the running data from a vehicle running on a predetermined course by manual driving of a driver (for example, the elderly) after the vehicle that can run by self-driving or manual driving performs a model running on the course by self-driving, to judge the propriety of the driver's driving for each predetermined item based on the acquired the running data, etc., to judge the propriety of renewing the driver's license based on the judgment result of propriety of the driver's driving for each item.

CITATION LIST

Patent Literature

Patent Literature 1: International Patent Publication No. WO 2020/049737

SUMMARY OF INVENTION

Technical Problem

However, in the driving judgment system described in Patent Literature 1, since it is not assumed that a vehicle that can run by self-driving or manual driving is used as a vehicle, there is a problem that it is impossible to acquire the running data from a vehicle running on a predetermined course by manual driving of a driver (for example, elderly people who take the elderly driver's license road skills test at a driving school) after the vehicle performs a model running on the course by self-driving, to judge the propriety of the driver's driving for each predetermined item based on the acquired the running data, etc. In addition, there is also a problem that it is impossible to judge the propriety of renewing the driver's license based on the judgment result of propriety of the driver's driving for each item.

In view of the aforementioned problems, the first purpose of this disclosure is to acquire the running data from a vehicle running on a predetermined course by manual driving of a driver after the vehicle performs a model running on the course by self-driving, to judge the propriety of the driver's driving for each predetermined item based on the acquired the running data, etc. The second purpose of this disclosure is to judge the propriety of renewing the driver's license based on the judgment result of propriety of the driver's driving for each item.

Solution to Problem

A driving judgment apparatus according to a first aspect of this disclosure includes: a running data acquisition unit for acquiring the running data of a vehicle running on a predetermined course by manual driving of a driver after the vehicle that can run by self-driving or manual driving performs a model running on the course by self-driving; and an item judgment unit for judging the propriety of the driver's driving for each item based on evaluation reference data and at least one of the difference between the running data acquired by the running data acquisition unit and model running data and the running data acquired by the running data acquisition unit.

An in-vehicle apparatus according to a second aspect of this disclosure includes: a running data detection unit for detecting the running data of a vehicle running on a predetermined course by manual driving of a driver after the vehicle that can run by self-driving or manual driving performs a model running on the course by self-driving; and a communication unit for transmitting the running data detected by the running data detection unit to the outside.

A driving judgment system according to a third aspect of this disclosure includes: a vehicle that can run by self-driving or manual driving; a server apparatus; the vehicle includes: a running data detection unit for detecting the running data of a vehicle running on a predetermined course by manual driving of a driver after the vehicle performs a model running on the course by self-driving; and a communication unit for transmitting the running data detected by the running data detection unit to the server apparatus; the server apparatus includes: running data acquisition unit for acquiring the running data to be transmitted from the vehicle; and an item judgment unit for judging the propriety of the driver's driving for each item based on evaluation reference data and at least one of the difference between the running data acquired by the running data acquisition unit and model running data and the running data acquired by the running data acquisition unit.

A driving judgment method according to a fourth aspect of this disclosure includes: a running data acquisition step for acquiring the running data of a vehicle running on a predetermined course by manual driving of a driver after the vehicle that can run by self-driving or manual driving performs a model running on the course by self-driving; and an item judgment step for judging the propriety of the driver's driving for each item based on evaluation reference data and at least one of the difference between the running data acquired by the running data acquisition unit and model running data and the running data acquired by the running data acquisition unit.

A data transmission method according to a fifth aspect of this disclosure includes: a running data detection step for detecting the running data of a vehicle running on a predetermined course by manual driving of a driver after the vehicle that can run by self-driving or manual driving performs a model running on the course by self-driving; and a communication step for transmitting the running data detected by the running data detection unit to the outside.

A recording media according to a sixth aspect of this disclosure is a non-transitory computer readable medium storing a program for causing an electronic device to execute the following steps of: a running data acquisition step for acquiring the running data of a vehicle running on a predetermined course by manual driving of a driver after the vehicle that can run by self-driving or manual driving performs a model running on the course by self-driving; and an item judgment step for judging the propriety of the driver's driving for each item based on evaluation reference data and at least one of the difference between the running data acquired by the running data acquisition unit and model running data and the running data acquired by the running data acquisition unit.

A recording media according to a seventh aspect of this disclosure is a non-transitory computer readable medium storing a program for causing an electronic device to execute the following steps of: a running data detection step for detecting the running data of a vehicle running on a predetermined course by manual driving of a driver after the vehicle that can run by self-driving or manual driving performs a model running on the course by self-driving; and a communication step for transmitting the running data detected by the running data detection unit to the outside.

Advantageous Effects of Invention

According to the present disclosure, it is possible to acquire the running data from a vehicle running on a predetermined course by manual driving of a driver after the vehicle performs a model running on the course by self-driving, to judge the propriety of the driver's driving for each predetermined item based on the acquired the running data, etc. In addition, it is possible to judge the propriety of renewing the driver's license based on the judgment result of propriety of the driver's driving for each item.

BRIEF DESCRIPTION OF DRAWINGS

FIG. 7 is examples of items for judging whether the driver is allowed to drive;
FIG. 8 is examples of items for judging whether the driver is allowed to drive;
FIG. 9 is examples of items for judging whether the driver is allowed to drive;
FIG. 10 is examples of items for judging whether the driver is allowed to drive.

EXAMPLE EMBODIMENT

First Embodiment

Hereafter, a driving judgment apparatus 50 (hereafter also referred to as a server apparatus 50) constituting a driving evaluation system 1, which is a first embodiment of the present invention, will be described with reference to the attached drawings. In each drawing, the corresponding components are given identical symbols, and overlapping descriptions are omitted.

First, a configuration example of the driving judgment apparatus 50 will be described with reference to FIG. 1.

Figure 1:
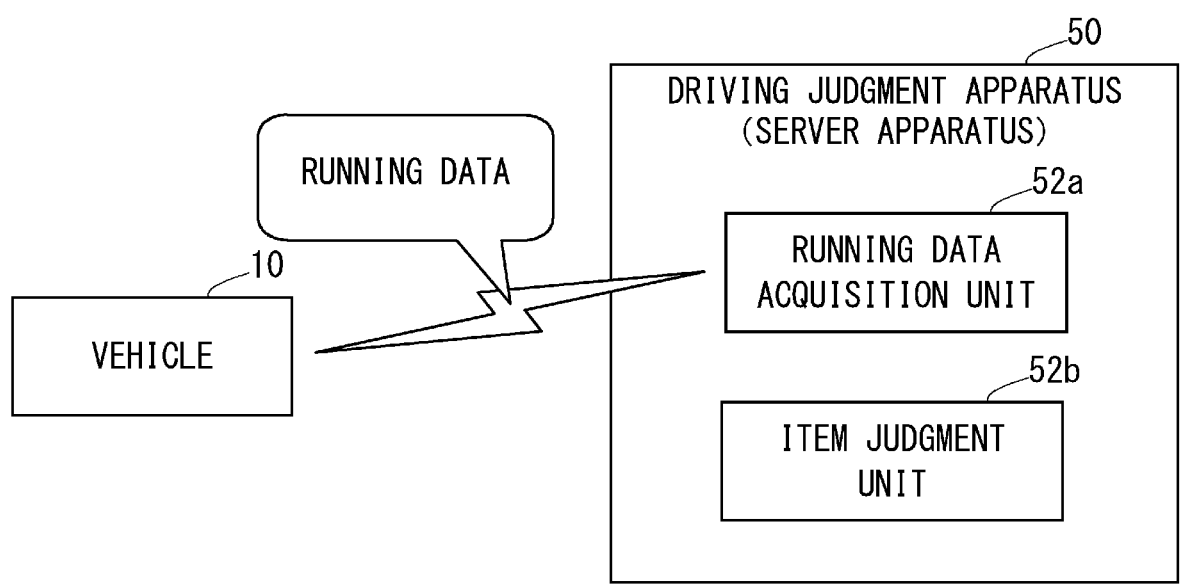
FIG. 1 is a schematic configuration diagram of a driving judgment apparatus 50.

FIG. 1 is a schematic configuration diagram of a driving judgment apparatus 50.

As shown in FIG. 1, the driving judgment apparatus 50 includes a running data acquisition unit 52a for acquiring the running data of a vehicle 10 running on a predetermined course by manual driving of a driver after the vehicle that can run by self-driving or manual driving performs a model running (an exemplary running) on the course by self-driving, and an item judgment unit 52b for judging the propriety of the driver's driving for each item based on evaluation reference data, and at least one of the difference (the difference between the running data acquired by the running data acquisition unit 52a and model running data) and the running data acquired by the running data acquisition unit 52a.

Next, an operation example of the driving judgment apparatus 50 will be described.

Figure 2:
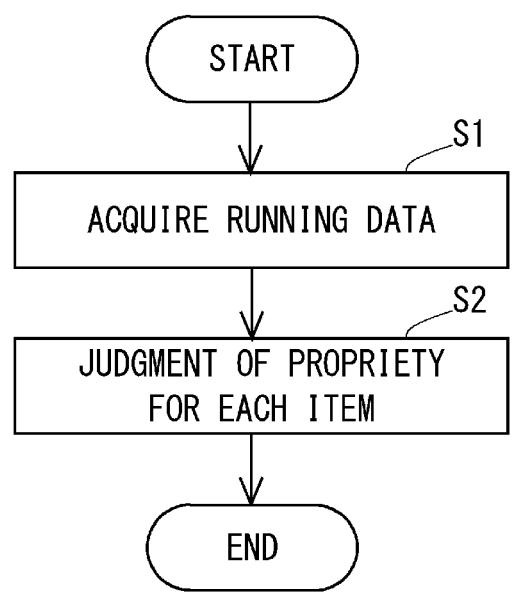
FIG. 2 is a flowchart of an operation example of the driving judgment apparatus 50.

FIG. 2 is a flowchart of an operation example of the driving judgment apparatus 50.

First, the running data acquisition unit 52a acquires the running data transmitted at a predetermined timing from the vehicle 10 running on a predetermined course by manual driving of a driver after the vehicle 10 performs a model running (an exemplary running) on the course by self-driving (step S1).

Next, the item judgment unit 52b judges the propriety of the driver's driving for each item based on evaluation reference data, and at least one of the difference (the difference between the running data acquired by the running data acquisition unit 52a and model running data) and the running data acquired by the running data acquisition unit 52a (step S2).

According to the first embodiment, it is possible to acquire the running data from the vehicle 10 running on a predetermined course by manual driving of a driver after the vehicle 10 performs a model running on the course by self-driving, to judge the propriety of the driver's driving for each predetermined item based on the acquired running data, etc.

Second Embodiment

Hereafter, a driving evaluation system 1 will be described in more detail as a second embodiment of this disclosure.

Figure 3:
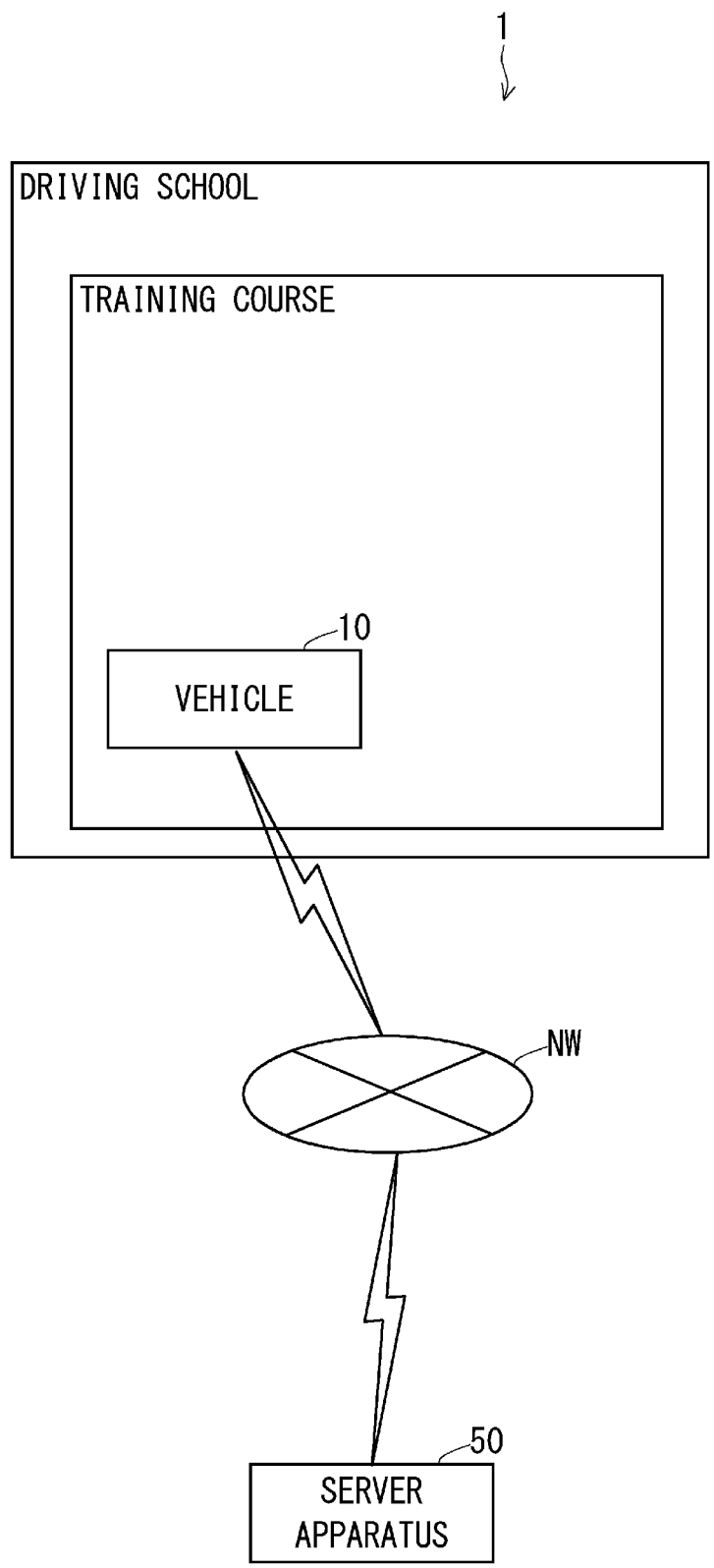
FIG. 3 is a detailed configuration diagram of the driving evaluation system 1.

FIG. 3 is a detailed configuration diagram of the driving evaluation system 1.

As shown in FIG. 3, the driving evaluation system 1 includes a vehicle 10 and a server apparatus 50.

Figure 4:
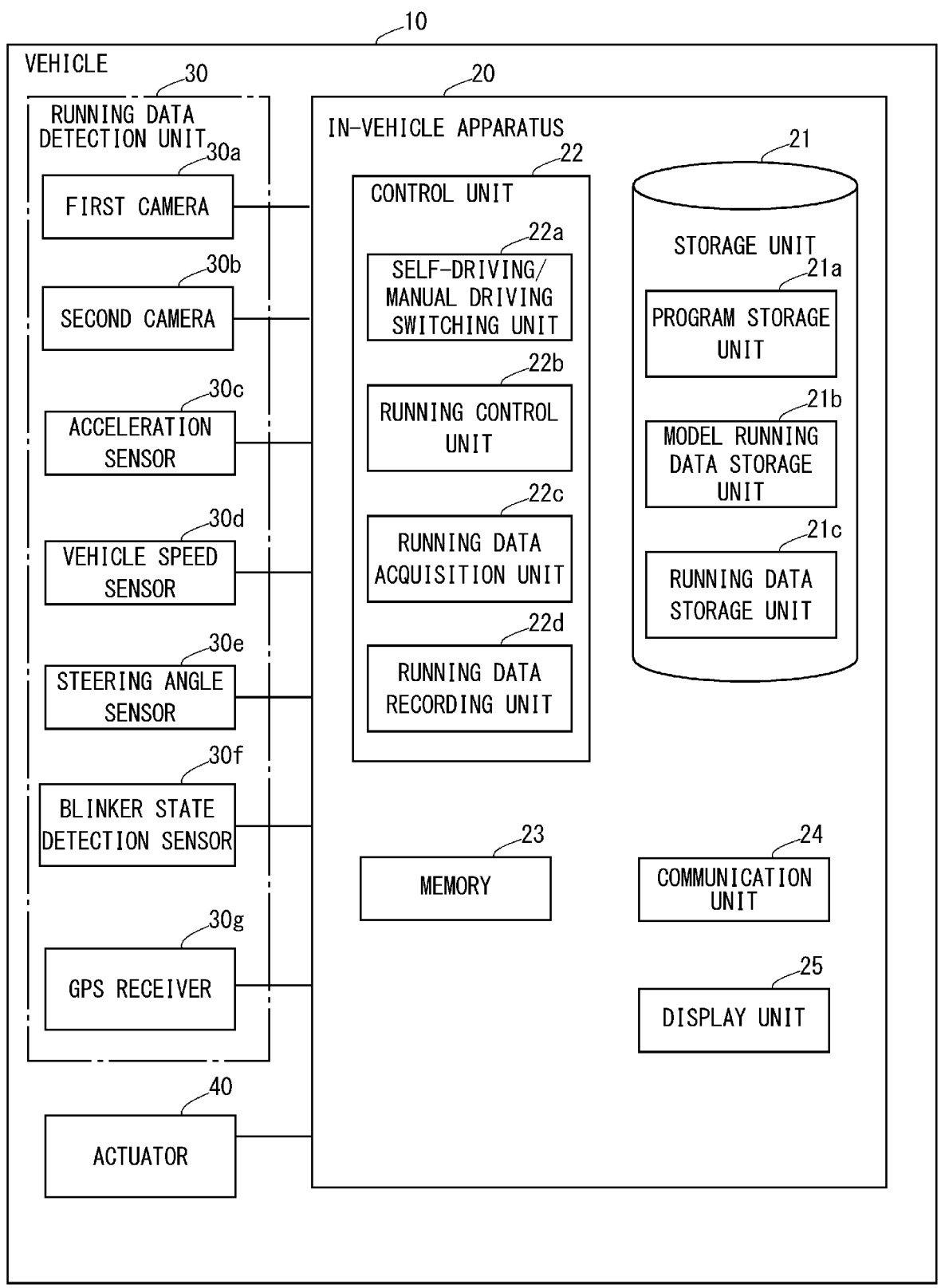
FIG. 4 is an example of the configuration of the vehicle 10.

FIG. 4 is an example of the configuration of the vehicle 10. The vehicle 10 is a vehicle that can run by self-driving or manual driving. The vehicle that can run by self-driving or manual driving is described, for example, in Japanese Patent Laid-Open No. 2016-132352.

As shown in FIG. 4, the vehicle 10 includes an in-vehicle apparatus 20, a running data detection unit 30, and an actuator 40.

The in-vehicle apparatus 20 includes a storage unit 21, a control unit 22, a memory 23, a communication unit 24, and a display unit 25.

The storage unit 21 is, for example, a non-volatile storage unit such as a hard disk drive or ROM. The storage unit 21 has, for example, a program storage unit 21a, a model running data storage unit 21b, and a running data storage unit 21c.

In the program storage unit 21a, a program to be executed by the control unit 22 is stored. In the model running data storage unit 21b, data (hereinafter referred to as model running data) for allowing the vehicle 10 to drive a predetermined course (for example, a course set up in a driving school. hereafter referred to as the training course) by self-driving is stored. In the running data storage unit 21c, the running data detected by the running data detection unit 30 is stored.

The control unit 22 has a processor (not shown). The control unit 22 (processor) is electrically connected to the storage unit 21, the memory 23, the communication unit 24, the display unit 25, the running data detection unit 30 and the actuator 40. The processor is, for example, a CPU. The processor can be a single processor or multiple processors. By executing the program read from the storage unit 21 (the program storage unit 21a) into the memory 23 (for example, RAM), the processor functions as a self-driving/manual driving switching unit 22a, a running control unit 22b, a running data acquisition unit 22c, a running data recording unit 22d, etc. These units may be realized by hardware.

The self-driving/manual driving switching unit 22a switches the vehicle 10 to a self-driving possible state or a manual driving possible state.

The running control unit 22b controls the actuator 40 based on the model running data stored in the storage unit 21 (the model running data storage unit 21b) to make the vehicle 10, which has been switched to the self-driving possible state, run on the training course by self-driving.

The running data acquisition unit 22c acquires the running data of the vehicle 10 running on the training course (the training course on which the vehicle 10 performed a model-running) by manual driving of a driver (for example, the elderly) after the vehicle 10 performs a model running (an exemplary running) on the training course by self-driving. Specifically, the running data acquisition unit 22c acquires the running data detected by the running data detection unit 30 from the running data detection unit 30.

The running data acquired by the running data acquisition unit 22c is, for example, a traffic light (for example, the position and color of the traffic light), a stop sign (for example, the location of the stop sign), a stop line (for example, the position of the stop line), which are detected by performing predetermined image processing on the image taken by a first camera 30a, driver's eye gaze and driver's driving posture detected by performing predetermined image processing on the image taken by a second camera 30b, the acceleration detected by an acceleration sensor 30c, the vehicle speed detected by a vehicle speed sensor 30d, the steering angle detected by a steering angle sensor 30e, the on/off state of a blinker detected by a blinker state detection sensor 30f, the current position (vehicular swept path) of the vehicle 10 determined based on radio waves etc. from GPS satellites received by a GPS receiver 30g.

The running data recording unit 22d stores the running data acquired by the running data acquisition unit 22c in the storage unit 21 (the running data storage unit 21c).

The communication unit 24 is a communication device that communicates wirelessly with the server apparatus 50 via a communication line NW (for example, the Internet).

The display unit 25 is, for example, a display device such as a liquid crystal display etc.

The running data detection unit 30 is, for example, a first camera 30a, a second camera 30b, an acceleration sensor 30c, a vehicle speed sensor 30d, a steering angle sensor 30e, a blinker state detection sensor 30f, and a GPS receiver 30g.

The first camera 30a is a camera which takes the front of the vehicle 10, the first camera 30a is provided, for example, in the cabin of the vehicle 10, and takes the front of the vehicle 10 through the windshield. A traffic light (for example, the position and color of the traffic light), a stop sign (for example, the location of the stop sign), a stop line (for example, the position of the stop line) are detected by performing predetermined image processing on the image taken by the first camera 30a. The second camera 30b is a camera which takes a driver seated in a driver's seat of the vehicle 10, and is provided, for example, in the cabin of the vehicle 10. Driver's eye gaze and driver's driving posture is detected by performing predetermined image processing on the image taken by the second camera 30b.

The acceleration sensor 30c is a sensor that detects acceleration of the vehicle 10. The vehicle speed sensor 30d is a sensor that detects vehicle speed of the vehicle 10. The steering angle sensor 30e is a sensor that detects steering angle of the steering of the vehicle 10. The blinker state detection sensor 30f is a sensor that detects on/off state of the blinker of the vehicle 10. The GPS receiver 30g receives radio waves arriving at the vehicle 10 from GPS satellites via an antenna (not shown) attached to the vehicle 10.

The actuator 40 includes a throttle actuator, a brake actuator, and a steering actuator. Self-driving of the vehicle 10 is realized by controlling the actuator 40 by the running control unit 22b.

Figure 5:
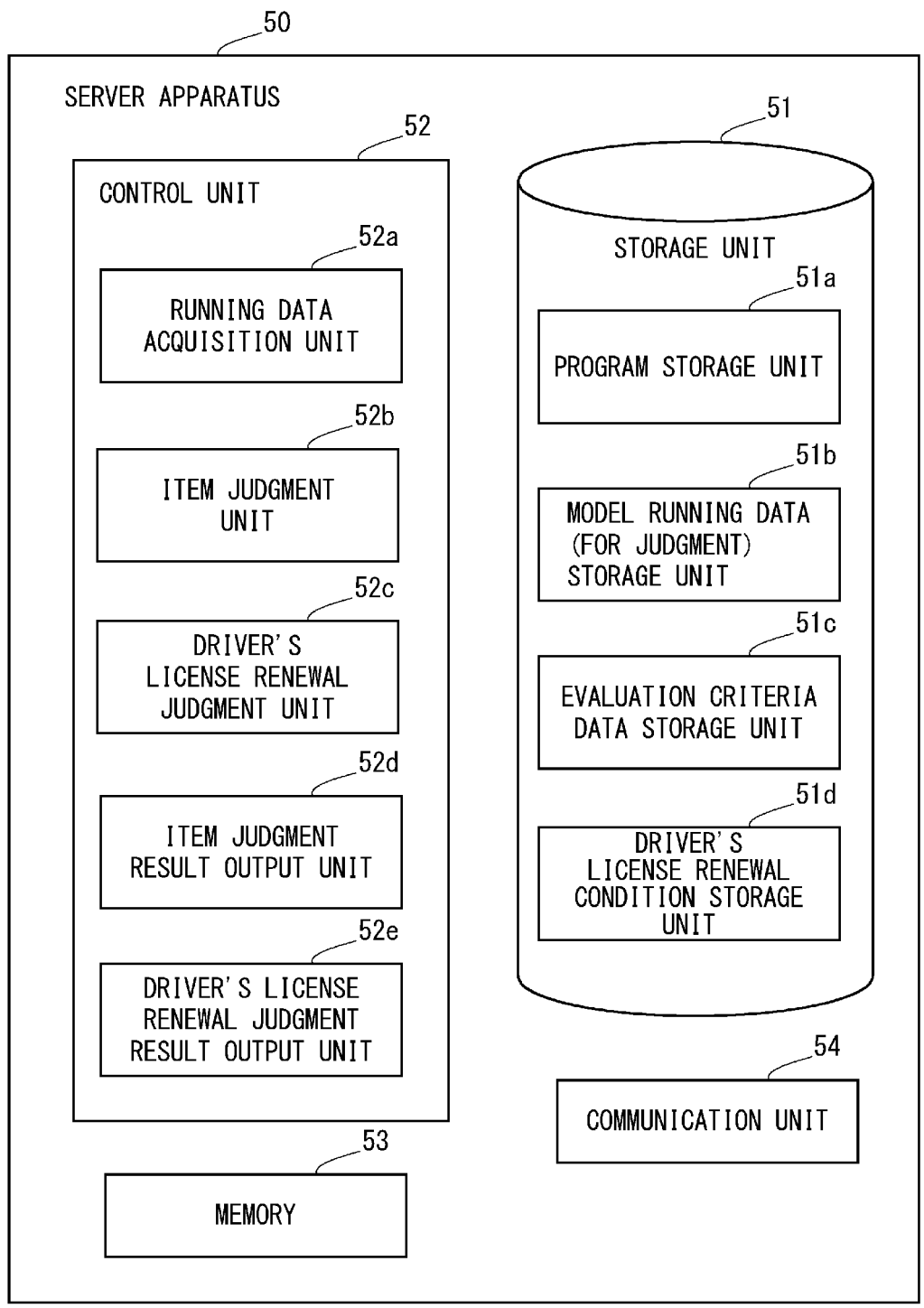
FIG. 5 is an example of the configuration of the server apparatus 50.

FIG. 5 is an example of the configuration of the server apparatus 50.

As shown in FIG. 5, the server apparatus 50 includes a storage unit 51, a control unit 52, a memory 53, and a communication unit 54.

The storage unit 51 is, for example, a non-volatile storage unit such as a hard disk drive or ROM. The storage unit 51 has, for example, a program storage unit 51a, a model running data (for judgment) storage unit 51b, an evaluation criteria data storage unit 51c, and a driver's license renewal condition storage unit 51d.

In the program storage unit 51a, a program to be executed by the control unit 52 is stored. In the model running data (for judgment) storage unit 51b, model running data (for example, the running data of the vehicle 10 that performed a model running on a training course by manual driving of an experienced driver. Hereafter referred to as model running data (for judgment)) is stored.

In the evaluation criteria data storage unit 51c, data (hereafter referred to as evaluation criteria data) for judging whether or not the driver is allowed to drive for each item is stored. FIGS. 7 to 10 are examples of items for judging whether the driver is allowed to drive.

In the driver's license renewal condition storage unit 51d, driver's license renewal conditions used to judge whether or not to renew a driver's license is stored.

The control unit 52 has a processor (not shown). The control unit 52 (processor) is electrically connected to the storage unit 51, the memory 53 and the communication unit 54. The processor is, for example, a CPU. The processor can be a single processor or multiple processors. By executing the program read from the storage unit 51 (the program storage unit 51a) into the memory 53 (for example, RAM), the processor functions as a running data acquisition unit 52a, an item judgment unit 52b, a driver's license renewal judgment unit 52c, an item judgment result output unit 52d, a driver's license renewal judgment result output unit 52e. These units may be realized by hardware.

The running data acquisition unit 52a acquires the running data transmitted from the vehicle 10 via the communication unit 54.

The item judgment unit 52b judges the propriety of the driver's driving for each item based on evaluation reference data stored in the evaluation criteria data storage unit 51c, and at least one of the difference (the difference between the running data acquired by the running data acquisition unit 52a and the model running data (for judgment) stored in the model running data (for judgment) storage unit 51b) and the running data acquired by the running data acquisition unit 52a.

As shown in FIGS. 7 to 10, items judged by the item judgment unit 52b include, for example, "deceleration before traffic light", "confirmation of traffic light", "slow driving before intersection", "confirmation of stop sign", "safety confirmation of intersecting roads", "two-step stop", "period of signal", "safety confirmation", "gradual course change", "deceleration before curve", "speed according to degree of curve", "stagger-free driving", "correct driving posture". For these items, the item judgment unit 52b judges based on the difference (the difference between the running data acquired by the running data acquisition unit 52a and the model running data (for judgment. for example, a threshold) stored in the model running data (for judgment) storage unit 51b), and evaluation reference data (for example, a threshold) stored in the evaluation criteria data storage unit 51c.

With respect to "deceleration before traffic light", when the difference between the acceleration (change in acceleration) before a signal in the running data acquired by the running data acquisition unit 52a and the acceleration (change in acceleration) before a signal in the model running data (for judgment) stored in the model running data (for judgment) storage unit 51b is lower than the evaluation reference data (for example, a threshold) stored in an evaluation criteria data storage unit 51c, the item judgment unit 52b judges that "deceleration before traffic light" is success. On the other hand, when the difference exceeds the threshold, the item judgment unit 52b judges that "deceleration before traffic light" is failure. Note that the change in acceleration may include a change in acceleration over time.

With respect to "confirmation of traffic light", when the difference between the time when driver's eye gaze was directed to the traffic light in the running data acquired by the running data acquisition unit 52a and the time when driver's eye gaze was directed to the traffic light was directed to the traffic light in the model running data (for judgment) stored in the model running data (for judgment) storage unit 51b is lower than the evaluation reference data (for example, a threshold) stored in the evaluation criteria data storage unit 51c, the item judgment unit 52b judges that "confirmation of traffic light" is success. On the other hand, when the difference exceeds the threshold, the item judgment unit 52b judges that "confirmation of traffic light" is failure.

With respect to "slow driving before intersection", when the difference between the acceleration (change in acceleration) before intersection in the running data acquired by the running data acquisition unit 52a and the acceleration (change in acceleration) before intersection in the model running data (for judgment) stored in the model running data (for judgment) storage unit 51b is lower than the evaluation reference data (for example, a threshold) stored in the evaluation criteria data storage unit 51c, the item judgment unit 52b judges that "slow driving before intersection" is success. On the other hand, when the difference exceeds the threshold, the item judgment unit 52b judges that "slow driving before intersection" is failure.

With respect to "confirmation of stop sign", when the difference between the time when driver's eye gaze was directed to the stop sign in the running data acquired by the running data acquisition unit 52a and the time when driver's eye gaze was directed to the stop sign in the model running data (for judgment) stored in the model running data (for judgment) storage unit 51b is lower than the evaluation reference data (for example, a threshold) stored in the evaluation criteria data storage unit 51c, the item judgment unit 52b judges that "confirmation of stop sign" is success. On the other hand, when the difference exceeds the threshold, the item judgment unit 52b judges that "confirmation of stop sign" is failure.

With respect to "safety confirmation of intersecting roads", when the difference between the pattern of driver's eye movement as the driver passes the intersecting road in the running data acquired by the running data acquisition unit 52a and the pattern of driver's eye movement as the driver passes the intersecting road in the model running data (for judgment) stored in the model running data (for judgment) storage unit 51b is lower than the evaluation reference data (for example, a threshold) stored in the evaluation criteria data storage unit 51c, the item judgment unit 52b judges that "safety confirmation of intersecting roads" is success. On the other hand, when the difference exceeds the threshold, the item judgment unit 52b judges that "safety confirmation of intersecting roads" is failure.

With respect to "two-step stop", when the difference between the vehicle speed (change in vehicle speed) before intersection in the running data acquired by the running data acquisition unit 52a and the vehicle speed (change in vehicle speed) before intersection in the model running data (for judgment) stored in the model running data (for judgment) storage unit 51b is lower than the evaluation reference data (for example, a threshold) stored in the evaluation criteria data storage unit 51c, the item judgment unit 52b judges that "two-step stop" is success. On the other hand, when the difference exceeds the threshold, the item judgment unit 52b judges that "two-step stop" is failure.

With respect to "timing of signal", when the difference between timing when the blinker is turned on or off in the running data acquired by the running data acquisition unit 52a and timing when the blinker is turned on or off in the model running data (for judgment) stored in the model running data (for judgment) storage unit 51b is lower than the evaluation reference data (for example, a threshold) stored in the evaluation criteria data storage unit 51c, the item judgment unit 52b judges that "timing of signal" is success. On the other hand, when the difference exceeds the threshold, the item judgment unit 52b judges that "timing of signal" is failure.

With respect to "safety confirmation", when the difference between the pattern of driver's eye movement as the driver changes course in the running data acquired by the running data acquisition unit 52a and the pattern of driver's eye movement as the driver changes course in the model running data (for judgment) stored in the model running data (for judgment) storage unit 51b is lower than the evaluation reference data (for example, a threshold) stored in the evaluation criteria data storage unit 51c, the item judgment unit 52b judges that "safety confirmation" is success. On the other hand, when the difference exceeds the threshold, the item judgment unit 52b judges that "safety confirmation" is failure.

With respect to "gradual course change", when the difference between steering angle (change in steering angle) as the driver changes course in the running data acquired by the running data acquisition unit 52a and steering angle (change in steering angle) as the driver changes course in the model running data (for judgment) stored in the model running data (for judgment) storage unit 51b is lower than the evaluation reference data (for example, a threshold) stored in the evaluation criteria data storage unit 51c, the item judgment unit 52b judges that "gradual course change" is success. On the other hand, when the difference exceeds the threshold, the item judgment unit 52b judges that "gradual course change" is failure.

With respect to "deceleration before curve", when the difference between the acceleration (change in acceleration) before curve in the running data acquired by the running data acquisition unit 52a and the acceleration (change in acceleration) before curve in the model running data (for judgment) stored in the model running data (for judgment) storage unit 51b is lower than the evaluation reference data (for example, a threshold) stored in the evaluation criteria data storage unit 51c, the item judgment unit 52b judges that "deceleration before curve" is success. On the other hand, when the difference exceeds the threshold, the item judgment unit 52b judges that "deceleration before curve" is failure.

With respect to "speed according to degree of curve", when the difference between the vehicle speed (change in vehicle speed) according to degree of curve in the running data acquired by the running data acquisition unit 52a and the vehicle speed (change in vehicle speed) according to degree of curve in the model running data (for judgment) stored in the model running data (for judgment) storage unit 51b is lower than the evaluation reference data (for example, a threshold) stored in the evaluation criteria data storage unit 51c, the item judgment unit 52b judges that "speed according to degree of curve" is success. On the other hand, when the difference exceeds the threshold, the item judgment unit 52b judges that "speed according to degree of curve" is failure.

With respect to "stagger-free driving", when the difference between vehicular swept path in the running data acquired by the running data acquisition unit 52a and vehicular swept path in the model running data (for judgment) stored in the model running data (for judgment) storage unit 51b is lower than the evaluation reference data (for example, a threshold) stored in the evaluation criteria data storage unit 51c, the item judgment unit 52b judges that "stagger-free driving" is success. On the other hand, when the difference exceeds the threshold, the item judgment unit 52b judges that "stagger-free driving" is failure.

With respect to "correct driving posture", when the difference between driving posture in the running data acquired by the running data acquisition unit 52a and driving posture in the model running data (for judgment) stored in the model running data (for judgment) storage unit 51b is lower than the evaluation reference data (for example, a threshold) stored in the evaluation criteria data storage unit 51c, the item judgment unit 52b judges that "correct driving posture" is success. On the other hand, when the difference exceeds the threshold, the item judgment unit 52b judges that "correct driving posture" is failure.

In addition to the above, items judged by the item judgment unit 52b include, for example, "driving according to traffic light" (see FIG. 7), "secure stopping" (see FIG. 8), "stop position" (see FIG. 8), and "presence or absence of signal" (see FIG. 9). These items are judged by the item judgment unit 52b based on the running data acquired by the running data acquisition unit 52a and the evaluation reference data (for example, a threshold) stored in the evaluation criteria data storage unit 51c.

With respect to "driving according to traffic light", when a traffic light in the running data acquired by the running data acquisition unit 52a is red, and the vehicle speed (change in vehicle speed) before traffic light is lower than the evaluation reference data (for example, a threshold) stored in the evaluation criteria data storage unit 51c, the item judgment unit 52b judges that "driving according to traffic light" is success. On the other hand, when the difference exceeds the threshold, the item judgment unit 52b judges that "driving according to traffic light" is failure.

With respect to "secure stopping", when the vehicle speed (change in vehicle speed) before stop sign in the running data acquired by the running data acquisition unit 52a is lower than the evaluation reference data (for example, a threshold) stored in the evaluation criteria data storage unit 51c, the item judgment unit 52b judges that "secure stopping" is success. On the other hand, when the vehicle speed (change in vehicle speed) before stop sign exceeds the threshold, the item judgment unit 52b judges that "secure stopping" is failure.

With respect to "stop position", when the distance between the stop line position and the vehicle stop position in the running data acquired by the running data acquisition unit 52a is lower than the evaluation reference data (for example, a threshold) stored in the evaluation criteria data storage unit 51c, the item judgment unit 52b judges that "stop position" is success. On the other hand, when the distance exceeds the threshold, the item judgment unit 52b judges that "stop position" is failure.

With respect to "presence or absence of signal", when there is history of turning on a blinker before an intersection in the running data acquired by the running data acquisition unit 52a, the item judgment unit 52b judges that "presence or absence of signal" is success. On the other hand, when there is not the history, the item judgment unit 52b judges that "presence or absence of signal" is failure.

The driver's license renewal judgment unit 52c judges the propriety of renewing the driver's license based on the judgment result of the item judgment unit 52b and the driver's license renewal conditions stored in the driver's license renewal condition storage unit 51d.

For example, when the judgment result of the item judgment unit 52b satisfies the driver's license renewal conditions stored in the driver's license renewal condition storage unit 51d, the driver's license renewal judgment unit 52c judges that the driver's license can be renewed. On the other hand, when the judgment result of the item judgment unit 52b does not satisfy the driver's license renewal conditions, the driver's license renewal judgment unit 52c judges that the driver's license cannot be renewed.

For example, the number of points for success (for example, points added) for each item and the number of points for failure (for example, points deducted) for each item are determined in advance.

Then, when the total score of all items exceeds the conditions for renewing the driver's license (for example, a threshold), the driver's license renewal judgment unit 52c judges that the driver's license can be renewed. On the other hand, when the total score of all items does not exceed the conditions for renewing the driver's license (for example, a threshold), the driver's license renewal judgment unit 52*c* judges that the driver's license cannot be renewed.

At that time, the driver's license renewal judgment unit 52*c* may determine whether the judgment result of the item judgment unit 52*b* satisfies the driver's license renewal conditions stored in the driver's license renewal condition storage unit 51*d*, considering weighting for each item.

In addition, when a specific item (for example, "driving according to traffic light") is failure, the driver's license renewal judgment unit 52*c* may determine that the driver's license cannot be renewed (the driver's license has expired) regardless of whether the total number of points exceeds the driver's license renewal conditions (for example, a threshold).

The item judgment result output unit 52*d* outputs the judgment result of the item judgment unit 52*b*. For example, the item judgment result output unit 52*d* transmits the judgment result of the item judgment unit 52*b* to the vehicle 10 via the communication unit 54 and displays it on the display unit 25 provided in the vehicle 10. The item judgment result output unit 52*d* may also print the judgment result of the judgment result of the item judgment unit 52*b* by a printer (not shown) connected to the server apparatus 50.

The driver's license renewal judgment result output unit 52*e* outputs the judgment result of the driver's license renewal judgment unit 52*c*. For example, the driver's license renewal judgment result output unit 52*e* transmits the judgment result of the driver's license renewal judgment unit 52*c* to the vehicle 10 via the communication unit 54 and displays it on the display unit 25 provided in the vehicle 10. The driver's license renewal judgment result output unit 52*e* may also print the judgment result of the judgment result of the driver's license renewal judgment unit 52*c* by a printer (not shown) connected to the server apparatus 50.

The communication unit 54 is a communication device that communicates wirelessly with the vehicle 10 via a communication line NW (for example, the Internet).

Next, an operation example of the driving evaluation system 1 will be described.

Figure 6:
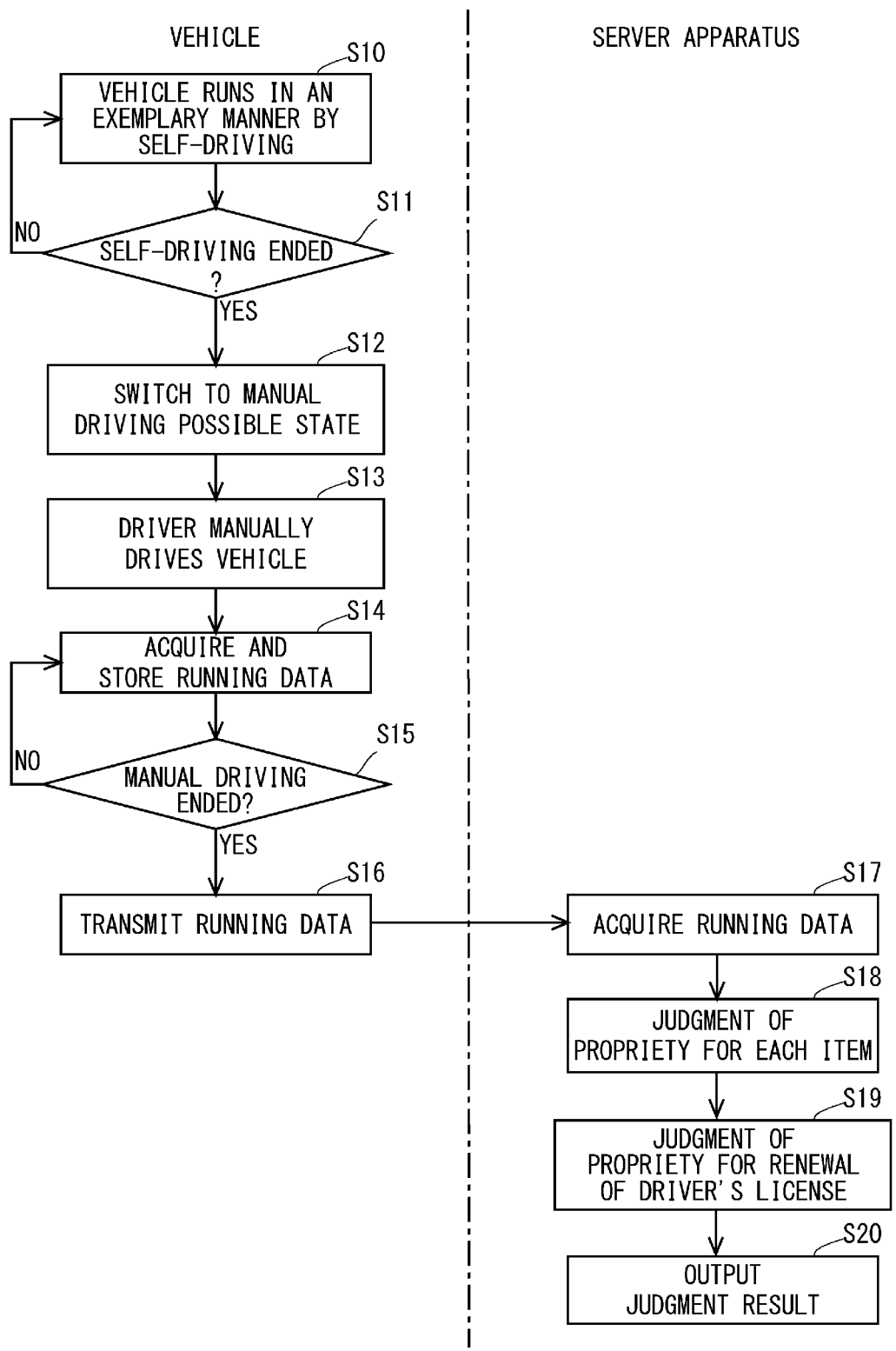
FIG. 6 is a flowchart of an operation example of the driving evaluation system 1.

FIG. 6 is a flowchart of an operation example of the driving evaluation system 1.

Hereafter, an example of performing an elderly driver's license renewal road skills test using the driving evaluation system 1 will be described. In the elderly driver's license road skills test, after the vehicle 10 in which an elderly person (hereinafter referred to as a driver) scheduled to take a road skills test is seated in the driver's seat performs a model running on a training course by self-driving, the driver performs manual driving on the training course.

First, the vehicle 10, which is switched to a self-driving possible state and in which a driver scheduled to take a road skills test is seated in the driver's seat, performs a model-running on a training course by self-driving (step S10). This is achieved by the running control unit 22*b* controlling the actuator 40 based on the model running data stored in the storage unit 21 (the model running data storage unit 21*b*). Note that, during the model running, the driver confirms the route that will be run later in the road skills test without operating the steering wheel or the like.

Next, when the vehicle 10 reaches the goal from the start point, that is, when the self-driving (model running) is ended (step S11: YES), the vehicle 10 is switched from the self-driving possible state to the manual driving possible state (step S12). This switching may be performed automatically or manually when the vehicle 10 reaches the goal from the start point.

Next, the driver performs manual driving of the vehicle 10 that has been switched to the manual driving possible state, and the vehicle 10 runs (road skills test) on the training course (the same training course as the model running) (step S13). During this time, the running data acquisition unit 22*c* acquires the running data of the vehicle 10 running on the training course by manual driving of the driver, and the running data recording unit 22*d* stores the running data acquired by the running data acquisition unit 22*c* in the storage unit 21 (the running data storage unit 21*c*) (step S14).

The processing of step S14 is repeatedly executed until the vehicle 10 reaches the goal from the start point, that is, until the manual driving (road skills test) ends (step S15: YES).

Next, when the manual driving is ended (step S15: YES), the running data stored in the storage unit 21 (the running data storage unit 21*c*) is transmitted to the server apparatus 50 via the communication unit 24 (step S16). Note that, the running data may be transmitted to the server apparatus 50 each time the running data acquisition unit 22*c* acquires it. The vehicle 10 may also be provided with a model running data (for judgment) storage unit 51*b*, and only the difference between the running data stored in the storage unit 21 (the running data storage unit 21*c*) and the model running data (for judgment) stored in the model running data (for judgment) storage unit 51*b* may be transmitted to the server apparatus 50.

Next, the running data acquisition unit 52*a* of the server apparatus 50 acquires (receives) the running data transmitted from the vehicle 10 via the communication unit 54 (step S17).

Next, the item judgment unit 52*b* of the server apparatus 50 judges the propriety of the driver's driving for each item based on evaluation reference data stored in the evaluation criteria data storage unit 51*c*, and at least one of the difference (the difference between the running data acquired by the running data acquisition unit 52*a* and the model running data (for judgment) stored in the model running data (for judgment) storage unit 51*b*) and the running data acquired by the running data acquisition unit 52*a* (step S18).

Next, the driver's license renewal judgment unit 52*c* of the server apparatus 50 judges the propriety of renewing the driver's license based on the judgment result of the item judgment unit 52*b* and the driver's license renewal conditions stored in the driver's license renewal condition storage unit 51*d* (step S19).

Next, the driver's license renewal judgment result output unit 52*e* of the server apparatus 50 outputs the judgment result of the driver's license renewal judgment unit 52*c*. The judgment result that is output is, for example, that the driver's license can be renewed or that the driver's license cannot be renewed. At this time, the item judgment result output unit 52*d* of the server apparatus 50 may also output the judgment result of the item judgment unit 52*b*. Note that, the outputted judgment result is presented to the driver by being displayed on the display unit 25 provided in the vehicle 10 or printed by a printer (not shown) (or in any other form).

As explained above, according to the second embodiment, it is possible to acquire the running data from a vehicle running on the same training course by manual driving of a driver after the vehicle performs a model running on the course by self-driving, to judge the propriety of the driver's driving for each predetermined item based on the acquired the running data, etc. (step S18). Also, according to the second embodiment, it is possible to judges whether or not the driver's license can be renewed based on judgment result of driver's propriety for each item (step S19). In other words, it will be possible to automate the elderly driver's license road skills test.

Also, according to the second embodiment, since the driver's license can be automatically judged whether or not the driver's license can be renewed without an examiner, there is no need for the examiner in charge of the elderly driver's license road skills test.

Also, according to the second embodiment, since it is possible to automatically determine whether or not a driver's license can be renewed without the examiner, it is possible to objectively determine whether or not a driver's license can be renewed without variation among drivers.

Also, according to the second embodiment, since the vehicle 10 in which a driver scheduled to take a road skills test is seated in the driver's seat performs a model run on the training course by self-driving, that is, since there is no need for an examiner to be on board, the road skills test can be conducted efficiently.

Also, according to the second embodiment, since the vehicle 10 in which a driver scheduled to take a road skills test is seated in the driver's seat performs a model run on the training course by self-driving, the correct driving (model driving) can be clearly shown in advance.

In addition, according to the second embodiment, since the correct driving (model driving) can be clearly shown in advance, trouble related to pass/fail (whether or not the driver's license can be renewed) can be reduced.

Next, variations are described.

In the above Embodiment 2, an example was described in which the driver's license renewal judgment unit 52c of the server apparatus 50 judges whether or not the driver's license can be renewed based on the judgment result of the item judgment unit 52b and the driver's license renewal conditions stored in the driver's license renewal condition storage unit 51d (step S19), the driver's license renewal judgment result output unit 52e of the server apparatus 50 outputs the judgment result of the driver's license renewal judgment unit 52c (step S20), but it is not limited to this.

For example, depending on the content of the road skills test, it may be possible to omit the judgment of whether or not the driver's license can be renewed (step S19) and the output of the judgment result of the driver's license renewal judgment unit 52c (step S20), and to execute only the judgment of whether or not the driver can drive for each item (step S18) and the output of the judgment result of the item judgment unit 52b.

Further, the display unit 25 may display guidance regarding the running route to the examinee (the driver) scheduled to take a road skills test during the model running (step S10) by self-driving. The guidance is, for example, guidance that makes the examinee (the driver during self-driving) confirm the location on the running route where the "deceleration before traffic light", "confirmation of traffic light", "slow driving before intersection", "confirmation of stop sign", "safety confirmation of intersecting roads", "two-step stop", "period of signal", "safety confirmation", "gradual course change", "deceleration before curve", "speed according to degree of curve", "stagger-free driving", and "correct driving posture" should be performed, but is not limited to these. Note that, a part of the functions of the display unit 25 may be replaced by an output unit (not shown), and may be designed to provide audio guidance.

In the above-described first and second embodiments, the program may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), CD-R, CD-R/W, and a semiconductor memory (such as a mask ROM, a PROM (Programmable ROM), an EPROM (Erasable PROM), a flash ROM, and a RAM (Random Access Memory)). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

All the numeral values mentioned in the above-described example embodiments are merely examples, and needless to say, numeral values different from them can be uses as desired.

The above-described example embodiments are merely examples in all the aspects thereof. The present invention should not be limited by the descriptions of the above-described example embodiments. The present invention may be carried out in various other forms without departing from the spirit or main features of the invention.

Further, the whole or part of the example embodiments disclosed above can be described as, but not limited to, the following supplementary notes.

(Supplementary Note 1)

A driving judgment apparatus comprising:
  a running data acquisition unit for acquiring the running data of a vehicle running on a predetermined course by manual driving of a driver after the vehicle that can run by self-driving or manual driving performs a model running on the course by self-driving; and
  an item judgment unit for judging the propriety of the driver's driving for each item based on evaluation reference data and at least one of the difference between the running data acquired by the running data acquisition unit and model running data and the running data acquired by the running data acquisition unit.

(Supplementary Note 2)

The driving judgment apparatus according to Supplementary note 1, further comprising:
  a driver's license renewal condition storage unit for storing the driver's license renewal conditions used to determine whether or not to renew the driver's license; and
  a driver's license renewal judgment unit for judging the propriety of renewing the driver's license based on the judgment result of the item judgment unit and the driver's license renewal conditions stored in the driver's license renewal condition storage unit.

(Supplementary Note 3)

The driving judgment apparatus according to Supplementary note 2, further comprising:
  a driver's license renewal judgment result output unit for outputting the judgment result of the driver's license renewal judgment unit.

(Supplementary Note 4)

The driving judgment apparatus according to any one of Supplementary notes 1 to 3, wherein:
  the driver's license renewal judgment unit judges whether the judgment result of the item judgment unit satisfies the driver's license renewal condition stored in the driver's license renewal condition storage unit, considering weighting for each item.

(Supplementary Note 5)

The driving judgment apparatus according to any one of Supplementary notes 1 to 4, further comprising:
an item judgment result output unit for outputting the judgment result of the item judgment unit.

(Supplementary Note 6)

An in-vehicle apparatus comprising:
a running data detection unit for detecting the running data of a vehicle running on a predetermined course by manual driving of a driver after the vehicle that can run by self-driving or manual driving performs a model running on the course by self-driving; and
a communication unit for transmitting the running data detected by the running data detection unit to the outside.

(Supplementary Note 7)

A driving judgment system comprising:
a vehicle that can run by self-driving or manual driving;
a server apparatus;
the vehicle includes:
a running data detection unit for detecting the running data of a vehicle running on a predetermined course by manual driving of a driver after the vehicle performs a model running on the course by self-driving; and
a communication unit for transmitting the running data detected by the running data detection unit to the server apparatus;
the server apparatus includes:
a running data acquisition unit for acquiring the running data to be transmitted from the vehicle; and
an item judgment unit for judging the propriety of the driver's driving for each item based on evaluation reference data and at least one of the difference between the running data acquired by the running data acquisition unit and model running data and the running data acquired by the running data acquisition unit.

(Supplementary Note 8)

A driving judgment method comprising:
a running data acquisition step for acquiring the running data of a vehicle running on a predetermined course by manual driving of a driver after the vehicle that can run by self-driving or manual driving performs a model running on the course by self-driving; and
an item judgment step for judging the propriety of the driver's driving for each item based on evaluation reference data and at least one of the difference between the running data acquired by the running data acquisition unit and model running data and the running data acquired by the running data acquisition unit.

(Supplementary Note 9)

A data transmission method comprising:
a running data detection step for detecting the running data of a vehicle running on a predetermined course by manual driving of a driver after the vehicle that can run by self-driving or manual driving performs a model running on the course by self-driving; and
a communication step for transmitting the running data detected by the running data detection unit to the outside.

(Supplementary Note 10)

A non-transitory computer readable medium storing a program for causing an electronic device to execute the following steps of:
a running data acquisition step for acquiring the running data of a vehicle running on a predetermined course by manual driving of a driver after the vehicle that can run by self-driving or manual driving performs a model running on the course by self-driving; and
an item judgment step for judging the propriety of the driver's driving for each item based on evaluation reference data and at least one of the difference between the running data acquired by the running data acquisition unit and model running data and the running data acquired by the running data acquisition unit.

(Supplementary Note 11)

A non-transitory computer readable medium storing a program for causing an electronic device to execute the following steps of:
a running data detection step for detecting the running data of a vehicle running on a predetermined course by manual driving of a driver after the vehicle that can run by self-driving or manual driving performs a model running on the course by self-driving; and
a communication step for transmitting the running data detected by the running data detection unit to the outside.

REFERENCE SIGNS LIST

1 DRIVING EVALUATION SYSTEM
10 VEHICLE
20 IN-VEHICLE APPARATUS
21 STORAGE UNIT
21a PROGRAM STORAGE UNIT
21b MODEL RUNNING DATA STORAGE UNIT
21c RUNNING DATA STORAGE UNIT
22 CONTROL UNIT
22a SELF-DRIVING/MANUAL DRIVING SWITCHING UNIT
22b RUNNING CONTROL UNIT
22c RUNNING DATA ACQUISITION UNIT
22d RUNNING DATA RECORDING UNIT
23 MEMORY
24 COMMUNICATION UNIT
30 RUNNING DATA DETECTION UNIT
30a FIRST CAMERA
30b SECOND CAMERA
30c ACCELERATION SENSOR
30d VEHICLE SPEED SENSOR
30e STEERING ANGLE SENSOR
30f BLINKER STATE DETECTION SENSOR
30g GPS RECEIVER
40 ACTUATOR
50 DRIVING JUDGMENT APPARATUS (SERVER APPARATUS)
51 STORAGE UNIT
51a PROGRAM STORAGE UNIT
51b MODEL RUNNING DATA (FOR JUDGMENT) STORAGE UNIT
51c EVALUATION CRITERIA DATA STORAGE UNIT
51d DRIVER'S LICENSE RENEWAL CONDITION STORAGE UNIT
52 CONTROL UNIT
52a RUNNING DATA ACQUISITION UNIT
52b ITEM JUDGMENT UNIT
52c DRIVER'S LICENSE RENEWAL JUDGMENT UNIT
52d ITEM JUDGEMENT RESULT OUTPUT UNIT
52e DRIVER'S LICENSE RENEWAL JUDGMENT RESULT OUTPUT UNIT
53 MEMORY
54 COMMUNICATION UNIT
NW COMMUNICATION LINE

What is claimed is:

1. A driving judgment apparatus comprising:
at least one memory storing:
instructions; and
a model running data for judgment storage unit in which model running data for judgment, being model running data for a predefined course, is stored in advance; and
at least one processor configured to execute the instructions to:
acquire the running data of a vehicle running on a predetermined course by manual driving of a driver after the vehicle that can run by self-driving or manual driving performs a model running on the course by self-driving; and
judge propriety of the driver's driving for each item based on an evaluation reference data and at least one of: (a) a difference between the running data acquired and model running data for judgment, and (b) the running data acquired, wherein
the manual driving is a manual operation in which the driver, who takes a road skills test, drives the vehicle that has been switched from a self-driving possible state to a manual driving possible state, on a same course as that used in the model running performed by self-driving, and
the model running is an actual real-world run that is achieved by controlling an actuator of the vehicle based on model running data, without the driver operating a steering wheel.

2. The driving judgment apparatus according to claim 1, wherein
the at least one processor is further configured to execute the instructions to
store driver's license renewal conditions used to determine whether or not to renew the driver's license; and
judge the propriety of renewing the driver's license based on a judgment result of the propriety of the driver's driving and the driver's license renewal conditions stored.

3. The driving judgment apparatus according to claim 2, wherein
the at least one processor is further configured to execute the instructions to output the judgment result.

4. The driving judgment apparatus according to claim 2, wherein:
the at least one processor is further configured to execute the instructions to
judge whether the judgment result satisfies the driver's license renewal condition stored, considering weighting for each item.

5. The driving judgment apparatus according to claim 1 wherein
the at least one processor is further configured to execute the instructions to output a judgment result of the propriety of the driver's driving.

6. An in-vehicle apparatus comprising:
at least one memory storing instructions; and
at least one processor configured to execute the instructions to:
detect running data of a vehicle running on a predetermined course by manual driving of a driver after the vehicle that can run by self-driving or manual driving performs a model running on the course by self-driving; and
transmit the running data detected to a driving judgment apparatus that is configured to:
store in advance model running data for judgment, being model running data for a predefined course;
acquire the running data of a vehicle running on a predetermined course by manual driving of a driver after the vehicle that can run by self-driving or manual driving performs a model running on the course by self-driving; and
judge propriety of the driver's driving for each item based on an evaluation reference data and at least one of: (a) a difference between the running data acquired and model running data for judgment, and (b) the running data acquired, wherein
the manual driving is a manual operation in which the driver, who takes a road skills test, drives the vehicle that has been switched from a self-driving possible state to a manual driving possible state, on a same course as that used in the model running performed by self-driving, and
the model running is an actual real-world run that is achieved by controlling an actuator of the vehicle based on model running data, without the driver operating a steering wheel.

7. A driving judgment method performed by a computer and comprising:
storing in advance model running data for judgment, being model running data for a predefined course;
acquiring the running data of a vehicle running on a predetermined course by manual driving of a driver after the vehicle that can run by self-driving or manual driving performs a model running on the course by self-driving; and
judging propriety of the driver's driving for each item based on an evaluation reference data and at least one of: (a) a difference between the running data acquired and model running data for judgment, and (b) the running data acquired, wherein
the manual driving is a manual operation in which the driver, who takes a road skills test, drives the vehicle that has been switched from a self-driving possible state to a manual driving possible state, on a same course as that used in the model running performed by self-driving, and
the model running is an actual real-world run that is achieved by controlling an actuator of the vehicle based on model running data, without the driver operating a steering wheel.

* * * * *